(12) United States Patent
Guo et al.

(10) Patent No.: US 10,819,397 B2
(45) Date of Patent: Oct. 27, 2020

(54) INFORMATION TRANSMISSION METHOD AND RELATED DEVICE

(71) Applicant: HUAWEI TECHNOLOGIES CO., LTD., Shenzhen, Guangdong (CN)

(72) Inventors: Zhiheng Guo, Beijing (CN); Lei Wan, Beijing (CN); Xinqian Xie, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/663,113

(22) Filed: Oct. 24, 2019

(65) Prior Publication Data

US 2020/0059273 A1    Feb. 20, 2020

Related U.S. Application Data (63) Continuation of application No. PCT/CN2018/092453, filed on Jun. 22, 2018.

(30) Foreign Application Priority Data

Jun. 22, 2017 (CN) .......................... 2017 1 0482321

(51) Int. Cl.
*H04B 7/0404* (2017.01)
*H04B 7/06* (2006.01)
(Continued)

(52) U.S. Cl.
CPC ......... *H04B 7/0404* (2013.01); *H04B 7/0686* (2013.01); *H04L 5/0053* (2013.01); *H04L 5/0094* (2013.01); *H04W 72/0413* (2013.01)

(58) Field of Classification Search
CPC ... H04B 7/0404; H04B 7/0686; H04L 5/0094; H04L 5/0053; H04W 72/0413
(Continued)

(56) References Cited

U.S. PATENT DOCUMENTS 9,167,446 B2    10/2015 Sikri et al.
9,907,059 B1 *   2/2018 Zhou ................. H04W 72/0413
(Continued)

FOREIGN PATENT DOCUMENTS

CN    104938009 A    9/2015
CN    105164938 A    12/2015
(Continued)

*Primary Examiner* — Hirdepal Singh
(74) *Attorney, Agent, or Firm* — Womble Bond Dickinson (US) LLP (57) ABSTRACT

This application discloses an information transmission method and a related device. The method includes: determining, by a terminal device, a first time element and a second time element, where the first time element is a time in which the terminal device sends first information to a first network device on a first carrier, the second time element is a time in which the terminal device sends second information to a second network device on a second carrier, and the first time element and the second time element overlap in time; and when the terminal device determines to send the first information to the first network device on the first carrier in the first time element, sending, by the terminal device, the second information to the second network device on the second carrier in a third time element.

16 Claims, 7 Drawing Sheets

(51) Int. Cl.
*H04L 5/00* (2006.01)
*H04W 72/04* (2009.01)

(58) Field of Classification Search
USPC .......................................................... 375/267
See application file for complete search history.

(56) References Cited

U.S. PATENT DOCUMENTS

| | | |
|---|---|---|
| 2014/0334356 A1* | 11/2014 | Kim ...................... H04L 5/0053 |
| | | 370/280 |
| 2015/0271765 A1 | 9/2015 | Hakola et al. |
| 2016/0073345 A1* | 3/2016 | Fan ...................... H04W 68/005 |
| | | 370/311 |
| 2016/0135143 A1 | 5/2016 | Won et al. |
| 2017/0055281 A1* | 2/2017 | Islam ................. H04W 72/0446 |
| 2017/0207872 A1 | 7/2017 | Song et al. |
| 2018/0368157 A1* | 12/2018 | Jeon .................... H04W 72/044 |
| 2019/0059127 A1* | 2/2019 | Fan ....................... H04L 1/1893 |
| 2019/0215857 A1* | 7/2019 | Lin ........................ H04L 5/0057 |
| 2019/0268855 A1 | 8/2019 | Kim et al. |
| 2019/0342793 A1 | 11/2019 | Kim et al. |
| 2020/0053677 A1* | 2/2020 | Tiirola .................. H04L 5/0082 |

FOREIGN PATENT DOCUMENTS

| | | |
|---|---|---|
| WO | 2016163798 A1 | 10/2016 |
| WO | 2017039167 A1 | 3/2017 |

* cited by examiner

INFORMATION TRANSMISSION METHOD AND RELATED DEVICE

CROSS-REFERENCE TO RELATED APPLICATIONS

This application is a continuation of International Application No. PCT/CN2018/092453, filed on Jun. 22, 2018, which claims priority to Chinese Patent Application No. 201710482321.3, filed on Jun. 22, 2017. The disclosures of the aforementioned applications are hereby incorporated by reference in their entireties.

TECHNICAL FIELD

This application relates to the field of communications technologies, and in particular, to an information transmission method and a related device.

BACKGROUND

Figure 1:
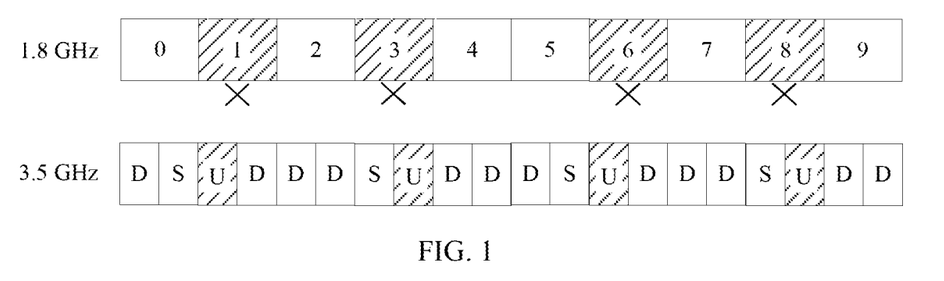
FIG. 1 is a schematic structural diagram of sending uplink signals at a same time in different systems in the prior art.

With continuous development of wireless communications technologies, a terminal can communicate by using different communications systems, and the different communications systems are generally deployed on different frequencies. For example, both a 5G new radio (NR) system and a long term evolution (LTE) system may be deployed in a frequency band less than 6 GHz. The LTE system is deployed on a frequency of 1.8 GHz, and the NR system may be deployed on a frequency of 3.5 GHz. In addition, a terminal operating in an LTE-NR dual connectivity (DC) mode is supported in the systems. In other words, the terminal may operate both in the LTE system and the NR system. In this deployment scenario, when the terminal simultaneously sends uplink signals to a base station in the NR system at 3.5 GHz and a base station in the LTE system at 1.8 GHz, according to a current protocol, the terminal supports sending an uplink signal on only one frequency at a same time point. As an example, when the terminal sends an uplink signal at 3.5 GHz, the terminal cannot send an uplink signal on the frequency of 1.8 GHz, or when the terminal sends an uplink signal at 1.8 GHz, the terminal cannot send an uplink signal at 3.5 GHz. For example, as shown in FIG. 1, at 3.5 GHz, a terminal needs to send an uplink signal of an NR system in a slot U, and at 1.8 GHz, the terminal needs to send uplink signals in subframes 1, 3, 6, and 8 in an LTE system. Because the terminal supports sending an uplink signal on only one frequency at a same time, that is, a signal sent to a base station in the LTE system needs to be discarded, or a signal sent to a base station in the NR system needs to be discarded, transmission performance of the LTE system or the NR system is affected. In particular, when the LTE system and the NR system need to send feedback signals, for example, an ACK/NACK, of downlink signals in these subframes, because the terminal cannot give feedback on the downlink signals received in downlink subframes corresponding to the ACK/NACK, the base station cannot determine whether to retransmit data or send new data. Consequently, the transmission performance of the LTE system or the NR system is affected.

SUMMARY

Embodiments of the disclosure provide an information transmission method and a related device, to help improve information transmission performance.

According to an aspect, an embodiment of the disclosure provides an information transmission method, including: determining, by a terminal device, a first time element and a second time element, where the first time element may be a time in which the terminal device sends first information to a first network device on a first carrier, the second time element may be a time in which the terminal device sends second information to a second network device on a second carrier, and the first time element and the second time element overlap in time; and when the terminal device determines to send the first information to the first network device on the first carrier in the first time element, sending, by the terminal device, the second information to the second network device on the second carrier in a third time element rather than the second time element. Therefore, when a time element in which the terminal device needs to send information on the first carrier and a time element in which the terminal device needs to send information on the second carrier overlap in time, both the information that needs to be transmitted by the terminal device on the first carrier and the second carrier can be sent, so as to help improve information transmission performance, and avoid a system downlink performance loss caused by discarding of an information feedback.

The first time element and the third time element do not overlap in time, and the third time element may be a time element after the second time element in time.

In one embodiment, time units corresponding to the first time element and the second time element respectively may be the same or different. Further, time units corresponding to the second time element and the third time element respectively may be the same. Further, in one embodiment, radio access technologies used on the first carrier and the second carrier may be different. The first information and/or the second information may be feedback information, or may be data information.

In one embodiment, when the terminal device determines that the first time element is not used by the terminal device to send the first information to the first network device on the first carrier, the terminal device may send the second information to the second network device on the second carrier in the second time element. For example, when the first information is data information, and the second information is feedback information, the terminal device may determine that the first information is not sent in the first time element, and send the second information on the second carrier in the second time element.

In one embodiment, the terminal device sends third information to the second network device on the second carrier in the third time element. The third information may be information sent in a predefined time sequence, and a resource used by the third information and a resource used by the second information may be different. In one embodiment, the third information may be feedback information, or may be data information.

In one embodiment, a frequency domain resource used by the third information and a frequency domain resource used by the second information may be different; or a code domain resource used by the third information and a code domain resource used by the second information may be different. In other words, when sending the second information and the third information in the third time element, the terminal device may send the second information and the third information in a frequency division manner, or may send the second information and the third information in a code division manner. In one embodiment, information about the frequency domain resource or the code domain resource may be sent by a network device to the terminal device. For example, the second network device may configure resource configuration information used to indicate the first resource and a second resource and send the resource configuration information to the terminal device. Alternatively, information about the frequency domain resource or the code domain resource may be further predefined. For example, a location of the frequency domain resource or the code domain resource is defined by using a protocol. This is not limited in this application.

In one embodiment, the terminal device receives resource configuration information from the second network device, and the resource configuration information is used to indicate the resource used by the third information and the resource used by the second information. Further, the sending, by the terminal device, the second information to the second network device on the second carrier in a third time element may be: sending, by the terminal device, the second information in the third time element on the resource that is on the second carrier and that is used by the second information. That the terminal device sends third information to the second network device on the second carrier in the third time element may be: The terminal sends the third information in the third time element on the resource that is on the second carrier and that is used by the third information. Therefore, the terminal device can send the second information and the third information by using different resources, so that the network device can distinguish between information sent in a normal time sequence and information sent with a delay.

According to another aspect, an embodiment of the disclosure further provides an information transmission method, including:

receiving, by a network device, uplink information from a terminal device; and when receiving the uplink information from the terminal device on a first resource, determining, by the network device, that the uplink information is information sent in a predefined time sequence; or when receiving the uplink information from the terminal device on a second resource, determining, by the network device, that the uplink information is delayed information, where the delayed information is information sent after a predefined time sequence of the information. The network device can distinguish between information sent in a normal time sequence and information sent with a delay.

In one embodiment, the uplink information may be feedback information, or may be data information.

In one embodiment, the first resource and the second resource may be different frequency domain resources in a time element; or the first resource and the second resource may be different code domain resources in a time element.

In one embodiment, the network device may further send resource configuration information to the terminal device, and the resource configuration information is used to indicate the first resource and the second resource. In one embodiment, the resource configuration information may be half-statically or dynamically sent by a second base station to the terminal device by using signaling.

According to still another aspect, an embodiment of the disclosure further provides a terminal device. The terminal device has functions of implementing behavior of the terminal device in the foregoing method examples. The functions may be implemented by hardware, or may be implemented by hardware by executing corresponding software. The hardware or software includes one or more units or modules corresponding to the foregoing functions.

In one embodiment, a structure of the network device includes a processing unit and a communications unit. The processing unit is configured to support the network device in performing the corresponding functions in the foregoing methods. The communications unit is configured to support communication between the network device and another device. The network device may further include a storage unit. The storage unit is configured to be coupled to the processing unit, and the storage unit stores a program instruction and data that are used for the network device. In an example, the processing unit may be a processor, the communications unit may be a transceiver, and the storage unit may be a memory.

According to still another aspect, an embodiment of the disclosure provides a network device. The network device has functions of implementing behavior of the first network device or the second network device in the foregoing method examples. The functions may be implemented by hardware, or may be implemented by hardware by executing corresponding software. The hardware or software includes one or more units or modules corresponding to the foregoing functions.

In one embodiment, a structure of the network device includes a processing unit and a communications unit. The processing unit is configured to support a base station in performing the corresponding functions in the foregoing methods. The communications unit is configured to support communication between the base station and another device. The base station may further include a storage unit. The storage unit is configured to be coupled to the processing unit, and the storage unit stores a program instruction and data that are used for the base station. In an example, the processing unit may be a processor, the communications unit may be a transceiver, and the storage unit may be a memory.

According to still another aspect, an embodiment of the disclosure provides a communications system. The system includes the terminal device and/or the network device in the foregoing aspects. In another embodiment, the system may further include another device in the solutions provided in the embodiments of the disclosure that interacts with the terminal device or the network device.

According to still another aspect, an embodiment of the disclosure provides a computer storage medium, configured to store a computer software instruction used by the foregoing terminal device. The computer storage medium includes a program designed for performing the foregoing aspects.

According to still another aspect, an embodiment of the disclosure provides a computer storage medium, configured to store a computer software instruction used by the foregoing network device. The computer storage medium includes a program designed for performing the foregoing aspects.

According to still another aspect, this application further provides a computer program product that includes an instruction. When the computer program product is run on a computer, the computer is enabled to perform the methods in the foregoing aspects.

According to still another aspect, this application provides a chip system. The chip system includes a processor, configured to support a terminal device in implementing the functions in the foregoing aspects, for example, generate or process data and/or information in the foregoing methods. In one embodiment, the chip system further includes a memory. The memory is configured to store a program instruction and data that are used for a data sending device.

The chip system may include a chip, or may include a chip and another discrete component.

According to still another aspect, this application provides a chip system. The chip system includes a processor, configured to support a network device in implementing the functions in the foregoing aspects, for example, receive or process data and/or information in the foregoing methods. In one embodiment, the chip system further includes a memory. The memory is configured to store a program instruction and data that are used for a data receiving device. The chip system may include a chip, or may include a chip and another discrete device.

Different from the prior art, in the solutions provided in the embodiments of the disclosure, the terminal device may determine the first time element and the second time element that overlap in time, and when determining that the first time element is used to send the first information to the first network device on the first carrier, the terminal device does not send the second information to the second network device in the second time element but sends the second information to the second network device on the second carrier in the third time element that is after the second time element in time. Therefore, when a time element in which the terminal device needs to send information on the first carrier and a time element in which the terminal device needs to send information on the second carrier overlap in time, both the information that needs to be sent by the terminal device on the first carrier and the second carrier can be sent, so as to help improve information transmission performance, and avoid a system downlink performance loss caused by discarding of an information feedback.

BRIEF DESCRIPTION OF DRAWINGS

To describe the technical solutions in the embodiments of the disclosure or in the background more clearly, the following describes the accompanying drawings required for describing the embodiments of the disclosure or the background.

DESCRIPTION OF EMBODIMENTS

The following describes the embodiments of the disclosure with reference to the accompanying drawings in the embodiments of the disclosure.

It should be understood that the technical solutions of this application may be applied to various communications networks, for example, a global system for mobile communications (GSM), a code division multiple access (CDMA) system, a wideband code division multiple access (WCDMA) system, a time division-synchronous code division multiple access (TD-SCDMA) system, a universal mobile telecommunications system (UMTS), a long term evolution (LTE) network, and the like. With continuous development of communications technologies, the technical solutions of this application may be further used in a future network, such as a 5th generation mobile communication technology (5G) network that may also be referred to as a new radio (NR) network, or may be used in a D2D (device to device) network, an M2M (machine to machine) network, and the like.

A network device in this application may be a network-side entity used to send or receive information, for example, may be a base station, or may be a transmission point (TP), a transmission reception point (TRP), a relay device, or another network device that has a function of a base station.

In this application, a terminal device is a device having a communication function, may also be referred to as a terminal, and may include a handheld device, a vehicle-mounted device, a wearable device, or a computing device that has a wireless communication function, another processing device connected to a wireless modem, or the like. The terminal device may have different names in different networks, for example, a terminal, user equipment (UE), a mobile station, a subscriber unit, a station, a cellular phone, a personal digital assistant, a wireless modem, a wireless communications device, a handheld device, a laptop computer, a cordless telephone set, and a wireless local loop station. The terminal device may be a wireless terminal or a wired terminal. The wireless terminal may be a device that provides a user with voice and/or data connectivity, a handheld device having a wireless connection function, or another processing device connected to a wireless modem, and may communicate with one or more core networks by using a radio access network (RAN).

In this application, a base station may also be referred to as a base station device, and is a device that is deployed in a radio access network to provide a wireless communication function. The base station may have different names in different radio access systems. For example, a base station in a universal mobile telecommunications system (UMTS) network is referred to as a NodeB, a base station in an LTE network is referred to as an evolved NodeB (eNB or eNodeB), and a base station may be referred to as a transmission reception point (TRP), a network node, or a gNodeB (g-NodeB, gNB) in a future 5G system. Examples are not listed one by one herein.

Signaling in the embodiments of this application may be higher layer signaling, such as a system message, a broadcast message, radio resource control (RRC) signaling, or medium access control (MAC) signaling. Alternatively, in one embodiment, the signaling may be physical layer signaling, for example, physical layer downlink control information (DCI) signaling. This is not limited in this application.

In this application, a time element may be an element corresponding to a time unit. The time unit is a time unit or a scheduling unit that is used to perform information transmission in time domain. The time unit includes an integer quantity of symbols in time domain, for example, the time unit may be a subframe, or may be a slot, or may be a radio frame, a mini-slot (mini slot or sub slot), a plurality of aggregated slots, a plurality of aggregated subframes, or a symbol, or may be a transmission time interval (TTI). This is not limited in this application. One or more time elements of a time unit may include an integer quantity of time elements of another time unit in time domain, or a length of one or more time elements of a time unit in time domain is equal to a sum of lengths of an integer quantity of time elements of another time unit. For example, one mini-slot/slot/subframe/radio frame includes an integer quantity of symbols, one slot/subframe/radio frame includes an integer quantity of mini-slots, one subframe/radio frame includes an integer quantity of slots, and one radio frame includes an integer quantity of subframes. Alternatively, another inclusion example may exist. This is not limited in this application.

Figure 2:
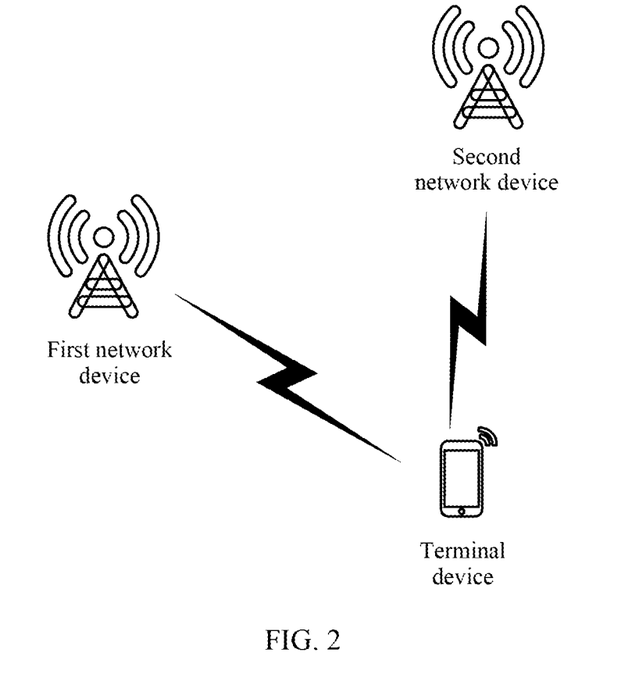
FIG. 2 is an architectural diagram of a communications system according to an embodiment.

The following describes an application scenario of this application. FIG. 2 is an architectural diagram of a communications system according to an embodiment of the disclosure. In one embodiment, as shown in FIG. 2, the communications system may include a terminal device, a first network device, and a second network device. The terminal device may perform information transmission with the first network device on a first carrier, and may perform information transmission with the second network device on a second carrier. In one embodiment, the first network device and the second network device may be deployed at a same site, that is, the first network device and the second network device may be deployed in one network device. Alternatively, the first network device and the second network device may be deployed at different sites, that is, the first network device and the second network device may be independently deployed. In one embodiment, the first network device and the second network device may communicate with the terminal device in a dual connectivity mode, so that the first carrier and the second carrier may overlap (partially or completely overlap), or may not overlap. Further, in one embodiment, radio access technologies used on the first carrier and the second carrier may be the same or different, that is, network device types of the first network device and the second network device may be the same or different. For example, a network device is a base station. An LTE technology and a 5G technology may be used on the first carrier and the second carrier respectively, that is, a first base station and a second base station may be an eNB in an LTE system and a gNB in a 5G system respectively. Alternatively, an LTE technology is used on both the first carrier and the second carrier, that is, both the first base station and the second base station may be eNBs. Alternatively, a 5G technology is used on both the first carrier and the second carrier, that is, both the first base station and the second base station may be gNBs. Examples are not listed one by one herein. Further, in one embodiment, the terminal device may further communicate by using a plurality of (more than two) base stations. The plurality of base stations may communicate with one terminal device in a multi connectivity mode. The multi connectivity may be considered as an extended form of dual connectivity. In one embodiment, any two connections in the multi connectivity are in a relationship of dual connectivity.

As shown in FIG. 2, when the terminal device performs information transmission with the first base station on the first carrier, and performs information transmission with the second base station on the second carrier, if a first time element in which the terminal device performs information transmission on the first carrier and a second time element in which the terminal device performs information transmission on the second carrier overlap, the terminal device may perform information transmission with the first base station on the first carrier in the first time element, and delay information originally transmitted in the second time element until a time element following the second time element, for example, delay information transmission with the second base station on the second carrier until a next available time element. In other words, when time elements for information transmission overlap, the terminal device may normally transmit information in one time element, and delay transmission of information in the other time element until a subsequent time element. A transmission time changes, but a carrier for information transmission does not change. In one embodiment, time units corresponding to the first time element and the second time element respectively may be the same, or time units corresponding to the first time element and the second time element respectively may be different.

In this application, information such as first information and second information may be feedback information (or referred to as "control information") such as an ACK (Acknowledgement), a NACK (Negative Acknowledgment), or discontinuous transmission (DTX), or may be data information such as a physical uplink shared channel (PUSCH). In this application, the information may also be referred to as a signal or another name. This is not limited in this application.

Figure 3:
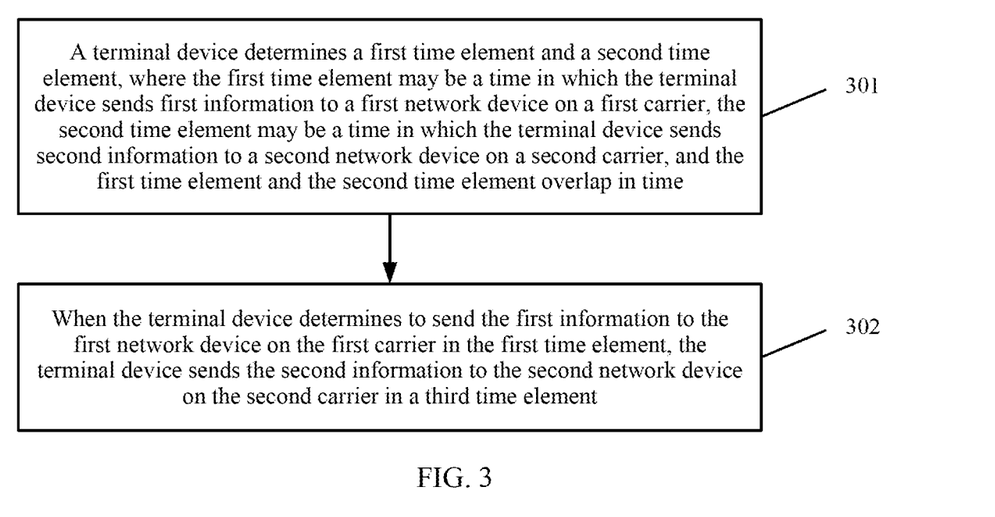
FIG. 3 is a schematic flowchart of an information transmission method according to an embodiment.

This application discloses an information transmission method, a terminal device, and a network device, to help improve information transmission performance. Details are separately described as follows:

FIG. 3 is a schematic flowchart of an information transmission method according to an embodiment of the disclosure. In one embodiment, as shown in FIG. 3, the information transmission method in this embodiment of the disclosure includes the following operations.

301. A terminal device determines a first time element and a second time element, where the first time element may be a time in which the terminal device sends first information to a first network device on a first carrier, the second time element may be a time in which the terminal device sends second information to a second network device on a second carrier, and the first time element and the second time element overlap in time.

In one embodiment, time units corresponding to the first time element and the second time element respectively may be the same. For example, both the time units corresponding to the first time element and the second time element are subframes. Alternatively, time units corresponding to the first time element and the second time element respectively may be different. For example, the time unit corresponding to the first time element is a subframe, and the time unit corresponding to the second time element is a slot; or the time unit corresponding to the first time element is a slot, and the time unit corresponding to the second time element is a subframe. This is not limited in this application.

302. When the terminal device determines to send the first information to the first network device on the first carrier in the first time element, the terminal device sends the second information to the second network device on the second carrier in a third time element.

The first time element and the third time element do not overlap in time, and the third time element may be a time element after the second time element in time. Radio access technologies used on the first carrier and the second carrier may be the same or different, and the first network device and the second network device may be the same (co-site) or different (inter-site).

In one embodiment, when the terminal device determines that the first time element is not used by the terminal device to send the first information to the first network device on the first carrier, the terminal device may send the second information to the second network device on the second carrier in the second time element.

In one embodiment, both the first information and the second information may be feedback information, such as an ACK/NACK. In one embodiment, when the feedback information needs to be sent in both the first time element and the second time element, the terminal device may send one of the first information and the second information in a predefined time sequence, and delay sending the other information. For example, the first network device is an eNB in an LTE system, and the second network device is a gNB in a 5G NR system. The terminal device may send the first information to the eNB on the first carrier in the first time element, and does not send the second information to the gNB on the second carrier in the second time element. Further, the terminal device may determine the third time element following the second time element, for example, a time element that is next to the second time element and that is used for feedback, and send the second information to the gNB on the second carrier in the third time element.

In one embodiment, the first information may be feedback information such as an ACK/NACK, and the second information may be data information such as a PUSCH. When the terminal device needs to send information in both the first time element and the second time element, the terminal device may send the first information to the first network device on the first carrier in the first time element, and does not send the second information to the second network device on the second carrier in the second time element. Further, in one embodiment, the terminal device may directly discard the second information. Alternatively, the terminal device may determine the third time element following the second time element, for example, a time element that is next to the second time element and that is used for feedback, and send the second information to the second network device on the second carrier in the third time element.

In one embodiment, both the first information and the second information may be data information such as a PUSCH. When the terminal device needs to send information in both the first time element and the second time element, the terminal device may send the first information to the first network device on the first carrier in the first time element, and does not send the second information to the second network device on the second carrier in the second time element (e.g., in one embodiment, may directly discard the second information or delay sending of the second information until the third time element). Alternatively, the terminal device may send the second information to the second network device on the second carrier in the second time element (e.g., in one embodiment, may directly discard the third information or delay sending of the third information until the third time element), and does not send the first information to the first network device on the first carrier in the first time element. Alternatively, the terminal device may send the first information to the first network device on the first carrier in the first time element, and send the second information to the second network device on the second carrier in the second time element; or the like. This is not limited in this application.

Further, in one embodiment, the terminal device may further send third information to the second network device on the second carrier in the third time element, and a resource used by the third information and a resource used by the second information may be different. For example, a frequency domain resource used by the third information and a frequency domain resource used by the second information may different. For another example, a code domain resource used by the third information and a code domain resource used by the second information may be different. In one embodiment, the third information may be information sent in a predefined time sequence, for example, feedback information. In one embodiment, for downlink information received by the terminal device, there are time elements in a predefined time sequence that are used to feed back information such as a receiving status for the downlink information. In other words, the third information may be information that is sent normally (that is, not "delayed") in the predefined time sequence.

Further, in one embodiment, a network device such as the second network device may generate resource configuration information, and may send the resource configuration information to the terminal device. The resource configuration information may be used to indicate the resource (a first resource) used by the third information and the resource (a second resource) used by the second information, so that the terminal device can receive the resource configuration information from the second network device. Further, when sending the second information and the third information, the terminal device may send the third information in the third time element on the first resource that is on the second carrier and that is indicated by the resource configuration information, and may send the second information in the third time element on the second resource that is on the second carrier and that is indicated by the resource configuration information. Further, the second network device may receive uplink information from the terminal device, such as the second information and the third information, and may determine, based on a resource location of the uplink information, whether the information is normally sent or sent with a delay. In one embodiment, when the second network device receives the uplink information, for example, the second information, from the terminal device on the first resource, the second network device may determine that the second information is information sent in the predefined time sequence, that is, information sent normally. When the second network device receives the uplink information, for example, the third information, from the terminal device on the second resource, the second network device may determine that the third information is delayed information, and the delayed information is information sent after a predefined time sequence of the information, that is, information sent with a delay. Therefore, the network device can distinguish between uplink information in a normal time sequence and delayed uplink information.

In this embodiment, the terminal device may determine the first time element and the second time element that overlap in time, and when determining that the first time element is used to send the first information to the first network device on the first carrier, the terminal device does not send the second information to the second network device in the second time element but sends the second information to the second network device on the second carrier in the third time element that is after the second time element in time. Therefore, when a time element in which the terminal device needs to send information on the first carrier and a time element in which the terminal device needs to send information on the second carrier overlap in time, both the information needing to be sent by the terminal device on the first carrier and the second carrier can be sent, so as to help improve information transmission performance, and avoid a system downlink performance loss caused by discarding of an information feedback.

Figure 4:
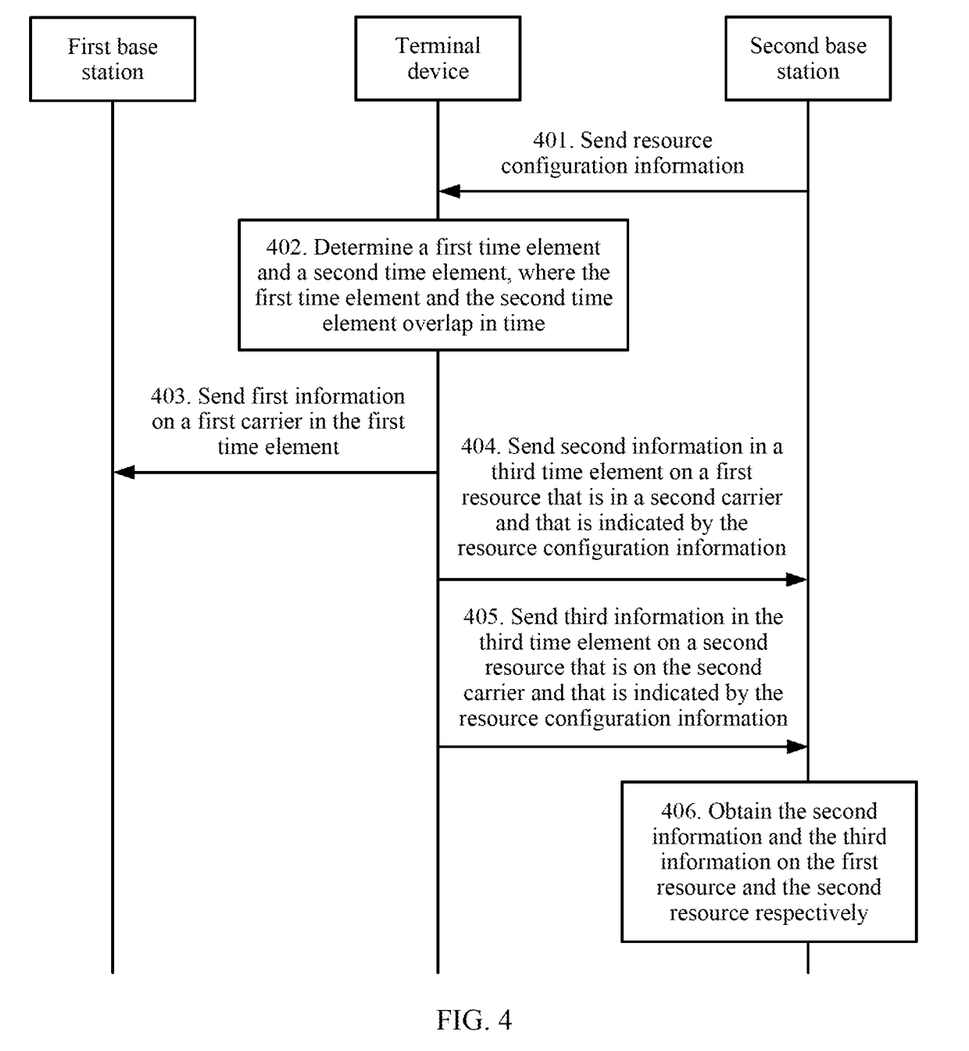
FIG. 4 is a schematic diagram of interaction in an information transmission method according to an embodiment.

FIG. 4 is a schematic diagram of interaction in an information transmission method according to an embodiment of the disclosure. In the embodiment of the disclosure, that a network device is a base station is used as an example for description. For example, a first base station and a second base station are respectively an eNB in an LTE system and a gNB in a 5G NR system. As shown in FIG. 4, the information transmission method in this embodiment of the disclosure may include the following operations.

401. The second base station sends resource configuration information to a terminal device, where the resource configuration information is used to indicate a first resource and a second resource.

In one embodiment, the first resource and the second resource may be different frequency domain resources in a time element such as a subframe or a slot. For example, frequency domain locations of resource blocks occupied by the first resource and the second resource are different. Alternatively, the first resource and the second resource may be different code domain resources in a time element, and the code domain resource includes orthogonal code and non-orthogonal code, and certainly further includes a scrambling code sequence. This is not limited herein. Further, the first resource and the second resource may be used to transmit different types of information. For example, the first resource is used to transmit normal information sent in a predefined time sequence, and the second resource is used to transmit delayed information sent after a predefined time sequence; or the second resource is used to transmit normal information sent in a predefined time sequence, and the first resource is used to transmit delayed information sent after a predefined time sequence. This is not limited in this application.

402. The terminal device determines a first time element and a second time element, where the first time element and the second time element overlap in time.

The first time element may be a time in which the terminal device sends first information to the first base station on a first carrier, and the second time element may be a time in which the terminal device sends second information to the second base station on a second carrier.

403. The terminal device sends the first information to the first base station on the first carrier in the first time element, and does not send the second information in the second time element.

404. The terminal device sends the second information to the second base station in a third time element on the first resource that is on the second carrier and that is indicated by the resource configuration information.

405. The terminal device sends third information to the second base station in the third time element on the second resource that is on the second carrier and that is indicated by the resource configuration information.

Figure 5:
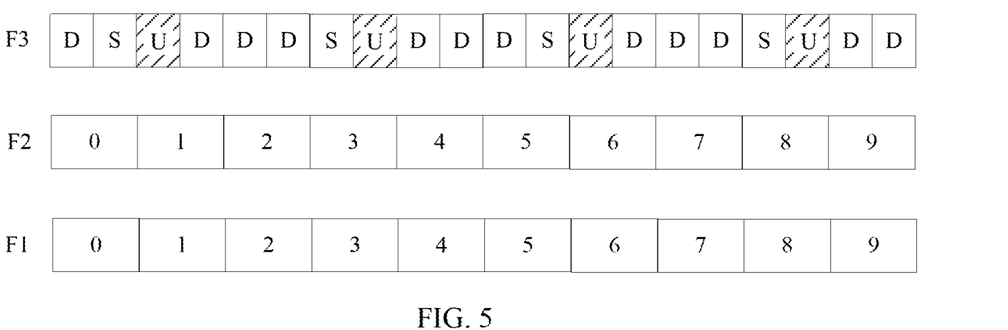
FIG. 5 is a schematic structural diagram of time elements in an LTE system and an NR system according to an embodiment.

In one embodiment, the terminal device may operate simultaneously in both an LTE system and an NR system. For example, the NR system may be deployed on a time division duplex (TDD) carrier on a frequency of 3.5 GHz, and the LTE system may be deployed on a frequency division duplex (FDD) carrier on a frequency of 1.8 GHz. For example, a frequency F3 of the TDD carrier in the NR system may be 3.5 GHz, a downlink frequency F2 in the LTE system may be 1.85 GHz, and an uplink frequency F1 in the LTE system may be 1.75 GHz, as shown in FIG. 5. Therefore, the terminal device can perform information transmission with the eNB in the LTE system on F1, and perform information transmission with the gNB in the NR system on F3.

Figure 6:
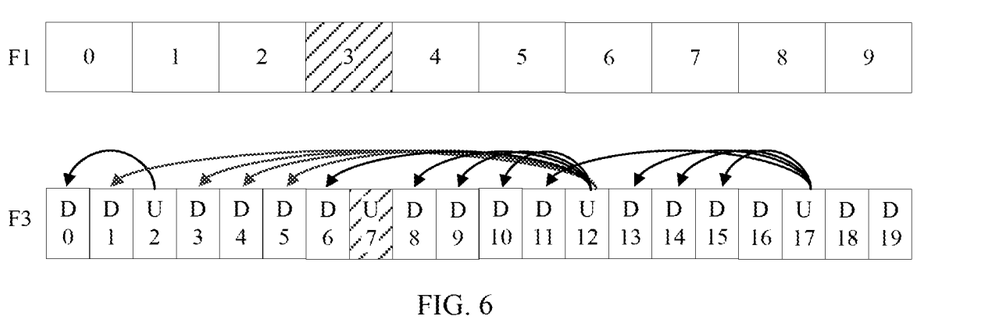
FIG. 6 is a schematic diagram of time elements in which information transmission is performed in an LTE system and an NR system according to an embodiment.

In one embodiment, both the first information and the second information may be feedback information such as an ACK/NACK, and it is assumed that the first base station is an eNB in the LTE system, and the second base station is a gNB in the 5G system. For example, the NR system is configured to use a subcarrier spacing of 30 KHz on F3 and use a TDD slot whose cycle is 2.5 ms, and the LTE system uses a subcarrier spacing of 15 KHz on F1, as shown in FIG. 6. When the terminal device needs to send an ACK/NACK in the NR system in a slot 7, namely, a slot U7, ACKs/NACKs of slots 1, 3, 4, and 5 are fed back in the slot 7 in a predefined time sequence. When the terminal device needs to send an ACK/NACK in the LTE system in a subframe 3 on F1, and further needs to simultaneously send the ACK/NACK in the NR system in the slot 7 on F3, because the slot 7 and the subframe 3 overlap in time, the terminal device may feed back the ACK/NACK to the eNB in the subframe 3, and the ACKs/NACKs of the slots 1, 3, 4, and 5 are not fed back in the slot 7, but may be delayed until a slot following the slot 7, for example, a next available feedback slot, namely a slot 12, to be fed back to the gNB. In addition, ACKs/NACKs of slots 6, 8, 9, and 10 are further fed back in the slot 12 in the predefined time sequence. In other words, in addition to the ACKs/NACKs (that is, normal information) of the slots 6, 8, 9 and 10 that need to be fed back to the gNB in the slot 12 in the predefined time sequence, ACKs/NACKs (that is, delayed information) of slots 0, 1, 2, 3, 4, and 5 further need to be fed back in the slot 12.

Figure 7:
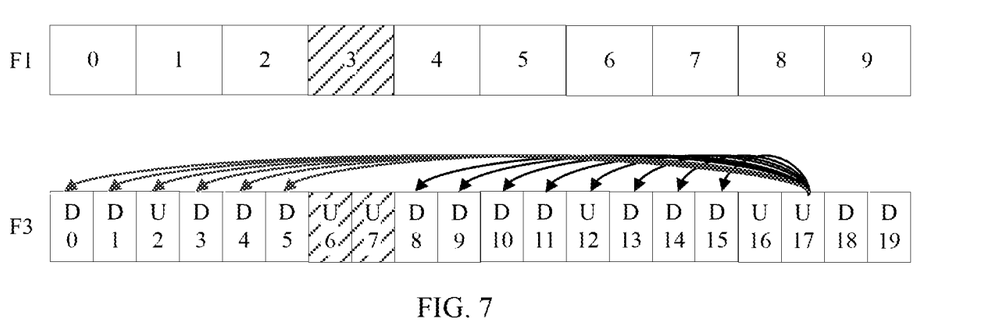
FIG. 7 is another schematic diagram of time elements in which information transmission is performed in an LTE system and an NR system according to an embodiment.

For another example, the NR system is configured to use a subcarrier spacing of 30 KHz on F3 and uses a TDD slot whose cycle is 5 ms, and the LTE system uses a subcarrier spacing of 15 KHz on F1, as shown in FIG. 7. When a terminal device needs to send an ACK/NACK in the NR system in a slot 7, ACKs/NACKs of slots 0, 1, 2, 3, 4, and 5 are fed back in the slot 7 in a predefined time sequence. When the terminal device needs to send an ACK/NACK in the LTE system to the eNB in a subframe 3 on F1, and further needs to simultaneously send the ACK/NACKs in the NR system in the slot 7 on F3, because the slot 7 and the subframe 3 overlap in time, the ACKs/NACKs of the slots 0, 1, 2, 3, 4, and 5 are not fed back in the slot 7, but may be delayed until a slot following the time slot 7, such as a slot 17, namely, U17, to be fed back to the gNB (or may be further delayed until a slot 16, namely U16, to be fed back), and ACKs/NACKs of slots 8, 9, 10, 11, 12, 13, 14 and 15 are further fed back in the slot 17 in the predefined time sequence. In other words, in addition to the ACKs/NACKs (that is, normal information) of the slots 8, 9, 10, 11, 12, 13, 14 and 15 that need to be fed back to the gNB in the slot 17 in the predefined time sequence, the ACKs/NACKs (that is, delayed information) of the slots 0, 1, 2, 3, 4, and 5 further need to be fed back in the slot 17.

In one embodiment, the first information may be feedback information such as an ACK/NACK, the second information may be data information such as a PUSCH, and it is assumed that the first base station is an eNB of the LTE system, and the second base station is a gNB of the 5G system. For example, as shown in FIG. 6, when a terminal device needs to send an ACK/NACK in the LTE system in a subframe 3 on F1, and further needs to simultaneously send a PUSCH in the NR system in a slot 7 on F3, because the slot 7 and the subframe 3 overlap in time, the terminal device may feed back the ACK/NACK to the eNB in the subframe 3, and the PUSCH is not sent in the slot 7, but delayed until a slot 12 to be sent to the gNB. Alternatively, the terminal device may feed back the ACK/NACK to the eNB in the subframe 3, and directly discard the PUSCH that needs to be sent in the slot 7. Similarly, it is assumed that the first base station is a gNB of the 5G system, and the second base station is an eNB of the LTE system. As shown in FIG. 6, when the terminal device needs to send an ACK/NACK of the NR system in the slot 7 on F3, and further needs to simultaneously send a PUSCH of the LTE system in the subframe 3 on F1, because the slot 7 and the subframe 3 overlap in time, ACKs/NACKs of the slots 1, 3, 4, and 5 can be fed back to the gNB in the slot 7, and the PUSCH of the subframe 3 may be directly discarded or sent with a delay, or the like. Details are not described herein.

In one embodiment, both the first information and the second information may be data information such as a PUSCH. As shown in FIG. 6, when the terminal device needs to send a PUSCH in the LTE system to the eNB in the subframe 3 on F1, and further needs to simultaneously send a PUSCH in the NR system in the slot 7 on F3, because the slot 7 and the subframe 3 overlap in time, the PUSCH may be sent to the eNB in the subframe 3, but the PUSCH that needs to be sent in the slot 7 on F3 is discarded or sent with a delay. Alternatively, the terminal device may send the PUSCH to the gNB in the slot 7 on F3, and discard or delay sending the PUSCH of the subframe 3. Alternatively, the terminal device may send the PUSCH to the eNB in the subframe 3, and simultaneously send the PUSCH to the gNB in the slot 7 on F3, and the like.

406. The second base station obtains the second information and the third information on the first resource and the second resource respectively.

In one embodiment, information about the first resource and the second resource may be sent by a base station to the terminal device, for example, the second base station may configure the resource configuration information used to indicate the first resource and the second resource and send the resource configuration information to the terminal device, as described in operation 401. Alternatively, the first resource and the second resource may be further predefined. For example, locations of the first resource and the second resource are defined by using a protocol. This is not limited in this application. Further, in one embodiment, the resource configuration information may be half-statically or dynamically sent by the second base station to the terminal device by using signaling.

In one embodiment, the second information and/or the third information may be feedback information such as an ACK/NACK, or may be data information. For example, the second information and the third information are feedback information such as an ACK/NACK. A resource used by the terminal to send an ACK/NACK (that is, the second information, which is delayed information, such as the ACKs/NACKs in the slots 1, 3, 4, and 5 shown in FIG. 6) corresponding to a first downlink slot in the third time element such as the slot 12 shown in FIG. 6 and a resource used by the terminal to send an ACK/NACK (that is, the third information, which is normal information, such as the ACKs/NACKs of the slots 6, 8, 9 and 10 shown in FIG. 6) corresponding to a second downlink slot are different. Further, the first resource can be used by the terminal device to send an ACK/NACK feedback in a predefined time sequence, and the second resource may be used by the terminal device to send a delayed ACK/NACK feedback. Correspondingly, the second base station needs to detect an ACK/NACK on the first resource and the second resource in each slot that may have an ACK/NACK feedback. Therefore, the base station can distinguish between an ACK/NACK in a normal time sequence and a delayed ACK/NACK.

In this embodiment, when a slot in which the terminal needs to send an ACK/NACK feedback on a carrier in the NR system and a slot/subframe in which the terminal needs to send an ACK/NACK feedback on a carrier in the LTE system overlap in time, the terminal device may delay sending of the ACK/NACK feedback on the carrier in the NR system until a next available uplink slot, so that both the ACKs/NACKs that need to be sent in the LTE system and the NR system by the terminal device can be sent, without discarding the ACK/NACK that needs to be sent on F1 or F3. Therefore, a system downlink performance loss caused by discarding the ACK/NACK feedback is avoided, so as to help ensure downlink performance of the LTE system and the NR system, and further ensure normal transmission of data.

The foregoing method embodiments are all examples to describe a method for selecting a function network element in this application. The description of each embodiment has respective focuses. For a part that is not described in detail in an embodiment, refer to related descriptions in another embodiment.

Figure 8:
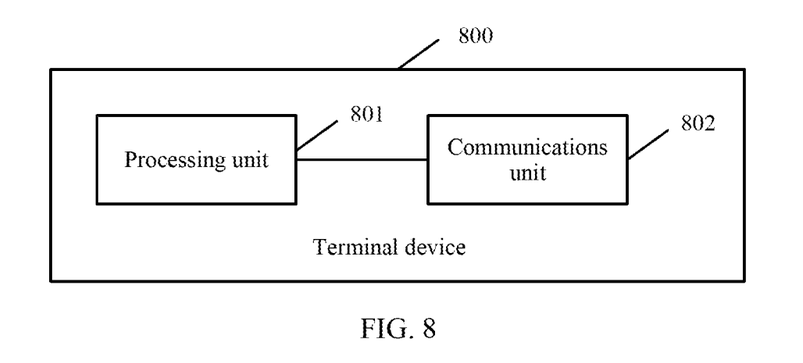
FIG. 8 is a schematic structural diagram of a terminal device according to an embodiment.

FIG. 8 is a possible schematic structural diagram of a terminal device according to the foregoing embodiments. As shown in FIG. 8, the terminal device 800 may include a processing unit 801 and a communications unit 802. These units may perform the corresponding functions in the foregoing method examples. For example, the processing unit 801 is configured to determine a first time element and a second time element, the first time element is a time in which the terminal device sends first information to a first network device on a first carrier, the second time element is a time in which the terminal device sends second information to a second network device on a second carrier, and the first time element and the second time element overlap in time. The communications unit 802 is configured to: when the processing unit 801 determines to send the first information to the first network device on the first carrier in the first time element, send the second information to the second network device on the second carrier in a third time element, the first time element and the third time element does not overlap in time, the third time element is a time element after the second time element in time, and radio access technologies used on the first carrier and the second carrier are different.

In one embodiment, the communications unit 802 is further configured to: when the processing unit 801 determines that the first time element is not used to send the first information to the first network device on the first carrier, send the second information to the second network device on the second carrier in the second time element.

In one embodiment, the communications unit 802 is further configured to send third information to the second network device on the second carrier in the third time element, where the third information is information sent in a predefined time sequence, and a resource used by the third information and a resource used by the second information are different.

In one embodiment, a frequency domain resource used by the third information and a frequency domain resource used by the second information are different; or a code domain resource used by the third information and a code domain resource used by the second information are different.

In one embodiment, the communications unit 802 may be further configured to receive resource configuration information from the second network device, where the resource configuration information is used to indicate the resource used by the third information and the resource used by the second information. The communications unit 802 is configured to send the second information in the third time element on the resource that is on the second carrier and that is used by the second information. The communications unit 802 is configured to send the third information in the third time element on the resource that is on the second carrier and that is used by the third information.

In one embodiment, the first information and/or the second information and/or the third information are/is feedback information.

It should be noted that, in this embodiment of the disclosure, unit division is an example, and is merely logical function division. In one embodiment, another division manner may be used. Function units in this embodiment of the disclosure may be integrated into one processing unit, or each of the units may exist alone physically, or two or more units are integrated into one unit. The foregoing integrated unit may be implemented in a form of hardware, or may be implemented in a form of a software function unit.

Figure 9:
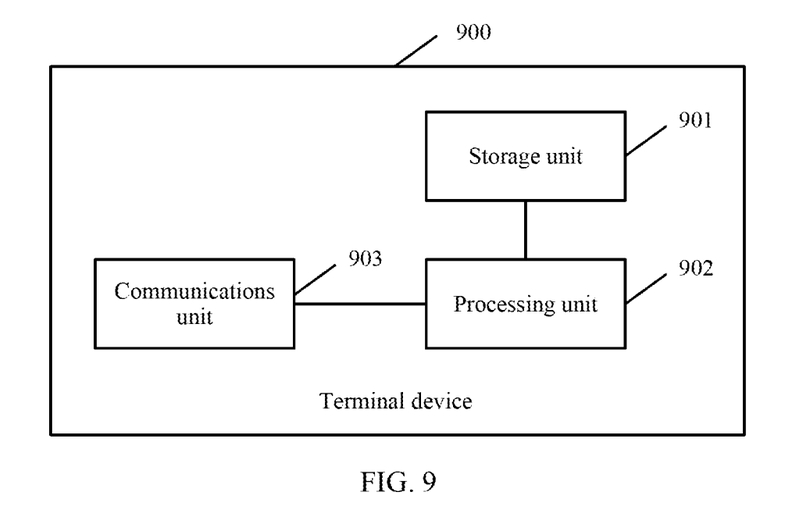
FIG. 9 is a schematic structural diagram of another terminal device according to an embodiment.

In a case of an integrated unit, FIG. 9 is another possible schematic structural diagram of a terminal device in the foregoing embodiments. As shown in FIG. 9, the terminal device 900 may include a processing unit 902 and a communications unit 903. The processing unit 902 may be configured to control and manage an action of the terminal device. For example, the processing unit 902 is configured to support the terminal device in performing processes 301 and 302 in FIG. 3 and processes 402, 403, 404, and 405 in FIG. 4, and/or is configured to support the terminal device in performing another process of a technology described in this specification. The communications unit 903 is configured to support the terminal device in communicating with another network entity, for example, communicating with a function module or a network entity shown in FIG. 3 to FIG. 8. The terminal device may further include a storage unit 901, configured to store program code and data of the terminal device.

The processing unit 902 may be a processor or a controller, for example, may be a central processing unit (CPU), a general purpose processor, a digital signal processor (DSP), an application-specific integrated circuit (ASIC), a field programmable gate array (FPGA), another programmable logical device, a transistor logical device, a hardware component, or any combination thereof. The processing unit 902 may implement or perform various example logical blocks, modules, and circuits described with reference to content disclosed in this application. Alternatively, the processor may be a combination for implementing a computing function, for example, a combination including one or more microprocessors, or a combination of a DSP and a microprocessor. The communications unit 903 may be a transceiver. The storage unit 901 may be a memory.

Figure 10:
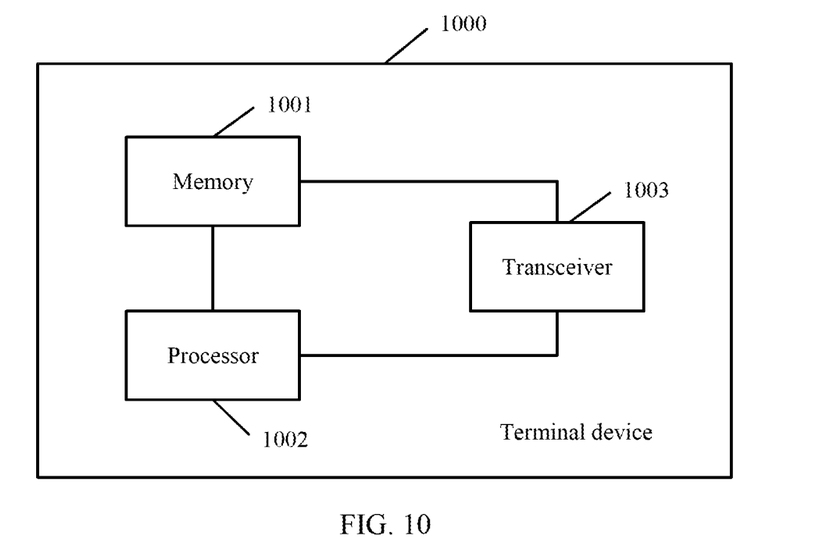
FIG. 10 is a schematic structural diagram of still another terminal device according to an embodiment.

As shown in FIG. 10, in another embodiment, a terminal device 1000 may include a processor 1002, a transceiver 1003, and a memory 1001. The transceiver 1003, the processor 1002, and the memory 1001 are interconnected. The processor may perform a function of the foregoing processing unit 902, the transceiver may have a function similar to that of the foregoing communications unit 903, and the memory may have a function similar to that of the foregoing storage unit 901.

Method or algorithm steps or operations described with reference to content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. An example storage medium is coupled to a processor, so that the processor can read information from the storage medium, and can write information into the storage medium. Certainly, the storage medium may be a component of a processor. The processor and the storage medium may be located in an ASIC. In addition, the ASIC may be located in a terminal device. Certainly, the processor and the storage medium may exist in the terminal device as discrete components.

Figure 11:
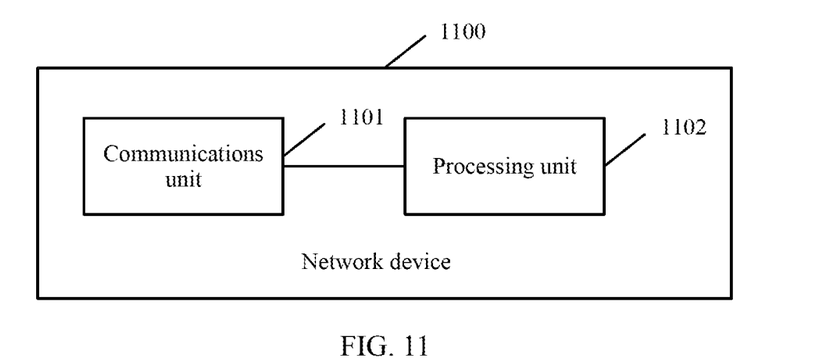
FIG. 11 is a schematic structural diagram of a network device according to an embodiment.

FIG. 11 is a possible schematic structural diagram of a network device in the foregoing embodiments. As shown in FIG. 11, the network device 1100 may include a communications unit 1101 and a processing unit 1102. These units may perform the corresponding functions of the network device such as the first network device or the second network device in the foregoing method examples. For example, the communications unit 1101 is configured to receive uplink information from a terminal device. The processing unit 1102 is configured to: when the communications unit receives the uplink information from the terminal device on a first resource, determine that the uplink information is information sent in a predefined time sequence. The processing unit 1102 is further configured to: when the communications unit receives the uplink information from the terminal device on a second resource, determine that the uplink information is delayed information, and the delayed information is information sent after a predefined time sequence of the information.

In one embodiment, the first resource and the second resource may be different frequency domain resources in a time element; or the first resource and the second resource may be different code domain resources in a time element.

In one embodiment, the communications unit 1101 may be further configured to send resource configuration information to the terminal device, where the resource configuration information is used to indicate the first resource and the second resource.

In one embodiment, the uplink information may be feedback information.

It should be noted that, in this embodiment of the disclosure, unit division is an example, and is merely logical function division. In one embodiment, another division manner may be used. Function units in this embodiment of the disclosure may be integrated into one processing unit, or each of the units may exist alone physically, or two or more units are integrated into one unit. The foregoing integrated unit may be implemented in a form of hardware, or may be implemented in a form of a software function unit.

Figure 12:
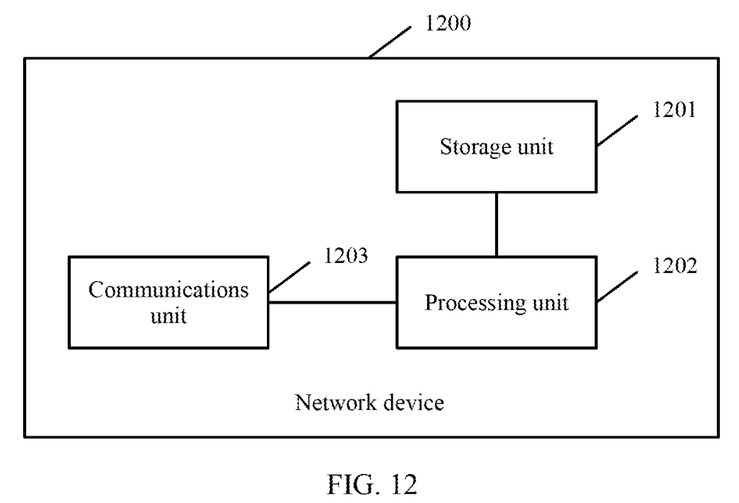
FIG. 12 is a schematic structural diagram of another network device according to an embodiment.

In a case of an integrated unit, FIG. 12 is another possible schematic structural diagram of a network device in the foregoing embodiments. As shown in FIG. 12, the network device 1200 may include a processing unit 1202 and a communications unit 1203. The processing unit 1202 may be configured to control and manage an action of the network device. For example, the processing unit 1202 is configured to support the network device in performing processes 401 and 406 in FIG. 4, and/or is configured to support the network device in performing another process of a technology described in this specification. The communications unit 1203 is configured to support the network device in communicating with another network entity, for example, communicating with a function module or a network entity shown in FIG. 3 to FIG. 8. The network device may further include a storage unit 1201, configured to store program code and data of the network device.

The processing unit 1202 may be a processor or a controller, for example, may be a central processing unit (CPU), a general purpose processor, a digital signal processor (DSP), an application-specific integrated circuit (ASIC), a field programmable gate array (FPGA), another programmable logical device, a transistor logical device, a hardware component, or any combination thereof. The processing unit 1202 may implement or perform various example logical blocks, modules, and circuits described with reference to content disclosed in this application. Alternatively, the processor may be a combination for implementing a computing function, for example, a combination including one or more microprocessors, or a combination of a DSP and a microprocessor. The communications unit 1203 may be a transceiver. The storage unit 1201 may be a memory.

Figure 13:
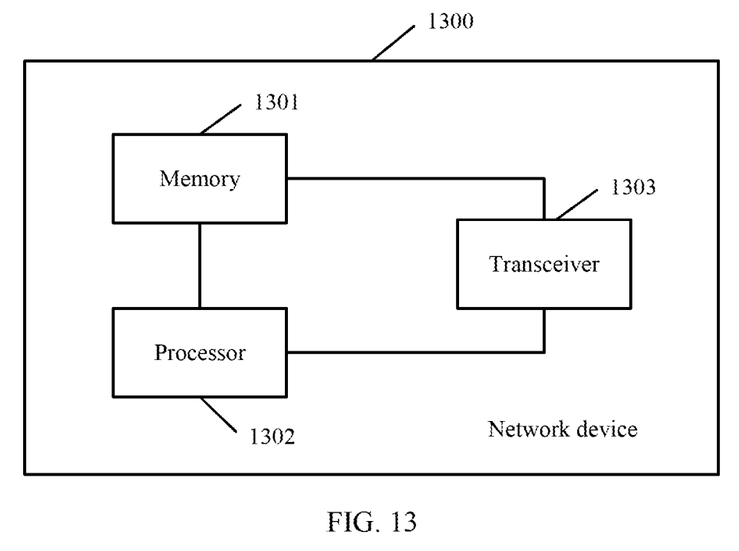
FIG. 13 is a schematic structural diagram of a still another network device according to an embodiment.

As shown in FIG. 13, in another embodiment, a network device 1300 may include a processor 1302, a transceiver 1303, and a memory 1301. The transceiver 1303, the processor 1302, and the memory 1301 are interconnected. The processor may perform a function of the foregoing processing unit 1202, the transceiver may have a function similar to that of the foregoing communications unit 1203, and the memory may have a function similar to that of the foregoing storage unit 1201.

Method or algorithm or operations described with reference to content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. An example storage medium is coupled to a processor, so that the processor can read information from the storage medium, and can write information into the storage medium. Certainly, the storage medium may be a component of a processor. The processor and the storage medium may be located in an ASIC. In addition, the ASIC may be located in a network device. Certainly, the processor and the storage medium may exist in the terminal device as discrete components.

In an implementation process, steps or operations in the foregoing methods can be implemented by using an integrated logical circuit of hardware in a processor, or by using an instruction in a form of software. Steps or operations of the method disclosed with reference to the embodiments of this application may be directly performed and completed by a hardware processor, or may be performed and completed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps or operations in the foregoing methods in combination with hardware of the processor. To avoid repetition, details are not described herein again.

It should be further understood that "first", "second", "third", "fourth", and various numbers in this specification are merely used for differentiation for ease of description, and are not construed as a limitation on the scope of the embodiments of the disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that sequence numbers of the foregoing processes do not mean execution sequences in various embodiments of this application. The execution sequences of the processes should be determined based on functions and internal logic of the processes, and should not be construed as any limitation on implementation processes of the embodiments of the disclosure.

A person of ordinary skill in the art may be aware that, with reference to various illustrative logical blocks (illustrative logical block) and steps or operations described in the embodiments disclosed in this specification, this application can be implemented by using electronic hardware or a combination of computer software and electronic hardware. Whether these functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, the apparatus, and the unit that are described above, refer to the corresponding process in the foregoing method embodiments, and details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all or the procedures or functions described in the embodiments of the disclosure are generated. The computer may be a general purpose computer, a special-purpose computer, a computer network, or another programmable apparatus. The computer instructions may be stored in a computer readable storage medium, or may be transmitted from a computer readable storage medium to another computer readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave) manner. The computer readable storage medium may be any available medium accessible to a computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for information transmission comprising:
   determining, by a terminal device, a first time element and a second time element, wherein the first time element is a time in which the terminal device sends first information to a first network device on a first carrier, the second time element is a time in which the terminal device sends second information to a second network device on a second carrier, and the first time element and the second time element overlap in time; and
   when the terminal device determines to send the first information to the first network device on the first carrier in the first time element, sending, by the terminal device, the second information to the second network device on the second carrier in a third time element, wherein,
   the first time element and the third time element do not overlap in time, the third time element is a time element after the second time element in time, and radio access technologies used on the first carrier and the second carrier are different, and
   sending, by the terminal device, third information to the second network device on the second carrier in the third time element, wherein the third information is information sent in a predefined time sequence.

2. The method according to claim 1, wherein the method further comprises:
   when the terminal device determines that the first time element is not used by the terminal device to send the first information to the first network device on the first carrier, sending, by the terminal device, the second information to the second network device on the second carrier in the second time element.

3. The method according to claim 1, wherein a resource used by the third information and a resource used by the second information are different.

4. The method according to claim 3, wherein a frequency domain resource used by the third information and a frequency domain resource used by the second information are different; or
   a code domain resource used by the third information and a code domain resource used by the second information are different.

5. The method according to claim 3, wherein the method further comprises:
   receiving, by the terminal device, resource configuration information from the second network device, wherein the resource configuration information is used to indicate the resource used by the third information and the resource used by the second information; wherein the sending, by the terminal device, the second information to the second network device on the second carrier in a third time element comprises:
   sending, by the terminal device, the second information in the third time element on a resource that is on the second carrier and that is used by the second information; and
the sending, by the terminal device, third information to the second network device on the second carrier in the third time element comprises:
   sending, by the terminal device, the third information in the third time element on a resource that is on the second carrier and that is used by the third information.

6. The method according to claim 1, wherein the first information or the second information is feedback information.

7. A terminal device comprising:
   a processing unit; and
   a communications unit,
   wherein the processing unit is configured to determine a first time element and a second time element, wherein the first time element is a time in which the terminal device sends first information to a first network device on a first carrier, the second time element is a time in which the terminal device sends second information to a second network device on a second carrier, and the first time element and the second time element overlap in time; and
   the communications unit is configured to: when the processing unit determines to send the first information to the first network device on the first carrier in the first time element, send the second information to the second network device on the second carrier in a third time element; wherein,
   the first time element and the third time element do not overlap in time, the third time element is a time element after the second time element in time, and radio access technologies used on the first carrier and the second carrier are different, and
   send third information to the second network device on the second carrier in the third time element, wherein the third information is information sent in a predefined time sequence.

8. The terminal device according to claim 7, wherein the communications unit is further configured to: when the processing unit determines that the first time element is not used by the terminal device to send the first information to the first network device on the first carrier, send the second information to the second network device on the second carrier in the second time element.

9. The terminal device according to claim 7, wherein a resource used by the third information and a resource used by the second information are different.

10. The terminal device according to claim 9, wherein a frequency domain resource used by the third information and a frequency domain resource used by the second information are different; or
   a code domain resource used by the third information and a code domain resource used by the second information are different.

11. The terminal device according to claim 9, wherein the communications unit is further configured to receive resource configuration information from the second network device, wherein the resource configuration information is used to indicate the resource used by the third information and the resource used by the second information;

the communications unit is configured to send the second information in the third time element on a resource that is on the second carrier and that is used by the second information; and the communications unit is configured to send the third information in the third time element on a resource that is on the second carrier and that is used by the third information.

12. The terminal device according to claim 7, wherein the first information or the second information is feedback information.

13. A network device comprising:

a communications unit; and a processing unit, wherein, the communications unit is configured to receive uplink information from a terminal device;

the processing unit is configured to: when the communications unit receives the uplink information from the terminal device on a first resource, determine that the uplink information is information sent in a predefined time sequence; and the processing unit is further configured to: when the communications unit receives the uplink information from the terminal device on a second resource, determine that the uplink information is delayed information, and the delayed information is information sent after a predefined time sequence of the information.

14. The network device according to claim 13, wherein the first resource and the second resource are different frequency domain resources in a time element; or the first resource and the second resource are different code domain resources in a time element.

15. The network device according to claim 13, wherein the communications unit is further configured to send resource configuration information to the terminal device, wherein the resource configuration information is used to indicate the first resource and the second resource.

16. The network device according to claim 13, wherein the uplink information is feedback information.

* * * * *

UNITED STATES PATENT AND TRADEMARK OFFICE
CERTIFICATE OF CORRECTION

PATENT NO. : 10,819,397 B2
APPLICATION NO. : 16/663113
DATED : October 27, 2020
INVENTOR(S) : Zhiheng Guo, Lei Wan and Xinqian Xie Page 1 of 1

It is certified that error appears in the above-identified patent and that said Letters Patent is hereby corrected as shown below:

In the Claims

In Claim 3, Column 19, Line 51 delete "wherein a resource used" and insert --wherein the method further comprises a resource--.

In Claim 3, Column 19, Line 53 delete "second information are different" and insert --second information that are different--.

In Claim 5, Column 20, Line 5 delete "element on a resource" and insert --element on the resource--.

In Claim 5, Column 20, Line 13 delete "element on a resource" and insert --element on the resource--.

In Claim 11, Column 21, Line 5 delete "element on a resource" and insert --element on the resource--.

In Claim 11, Column 21, Line 9 delete "element on a resource" and insert --element on the resource--.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*